United States Patent [19]

Mastanduno

[11] Patent Number: 5,271,954
[45] Date of Patent: Dec. 21, 1993

[54] FLUID FLOW VISUALIZATION SYSTEM

[75] Inventor: Richard T. Mastanduno, Milford, Conn.

[73] Assignee: Avco Corporation, Providence, R.I.

[21] Appl. No.: 922,039

[22] Filed: Jul. 29, 1992

[51] Int. Cl.$^5$ .......................... B05D 3/02; B05D 3/04
[52] U.S. Cl. .......................................... 427/8; 116/201; 427/378
[58] Field of Search .................. 73/861; 116/201, 264, 116/273; 427/8, 328

[56] References Cited

U.S. PATENT DOCUMENTS

| | | | |
|---|---|---|---|
| 2,537,165 | 1/1951 | Smith et al. | 49/84 |
| 3,301,046 | 1/1967 | Rubert et al. | 73/147 |
| 3,415,122 | 12/1968 | Yee | 73/356 |
| 3,574,584 | 4/1971 | Girard et al. | 65/59 |
| 4,102,678 | 7/1978 | Gothard et al. | 427/325 X |
| 4,347,805 | 9/1982 | Ernest | 118/63 |
| 4,410,126 | 10/1983 | O'Rourke | 228/180 R |
| 4,559,312 | 12/1985 | Kim et al. | 501/1 |
| 4,708,281 | 11/1987 | Nelson et a. | 228/180.1 |
| 4,774,835 | 10/1988 | Holmes et al. | 73/147 |
| 4,915,975 | 4/1990 | Watson | 427/8 |

Primary Examiner—Michael Lusignan
Attorney, Agent, or Firm—Perman & Green

[57] ABSTRACT

The invention concerns the application of a layer of ceramic or glass particles to the surface of a substrate which is to be heated. The glass or ceramic particles are sized and mixed with an organic binder which yields a thin slurry consistency. The carrier or binder hardens. The part is subjected to a running environment with air flow directed across its surface, and then inspected after test to determine flow direction and possibly relative magnitude of the flow. This binder leaves essentially no residue after combustion and holds the glassy particles together so they adhere to the substrate at low temperature. The glass or ceramic particles in the coating are chosen to have a melting point below the operating temperature of the surface so that the applique will flow in the direction of gas movement. Additionally, the choice of melting point is made to give the coating a viscosity which permits enough "smearing" at the velocity and time of interest for visual inspection.

8 Claims, 2 Drawing Sheets

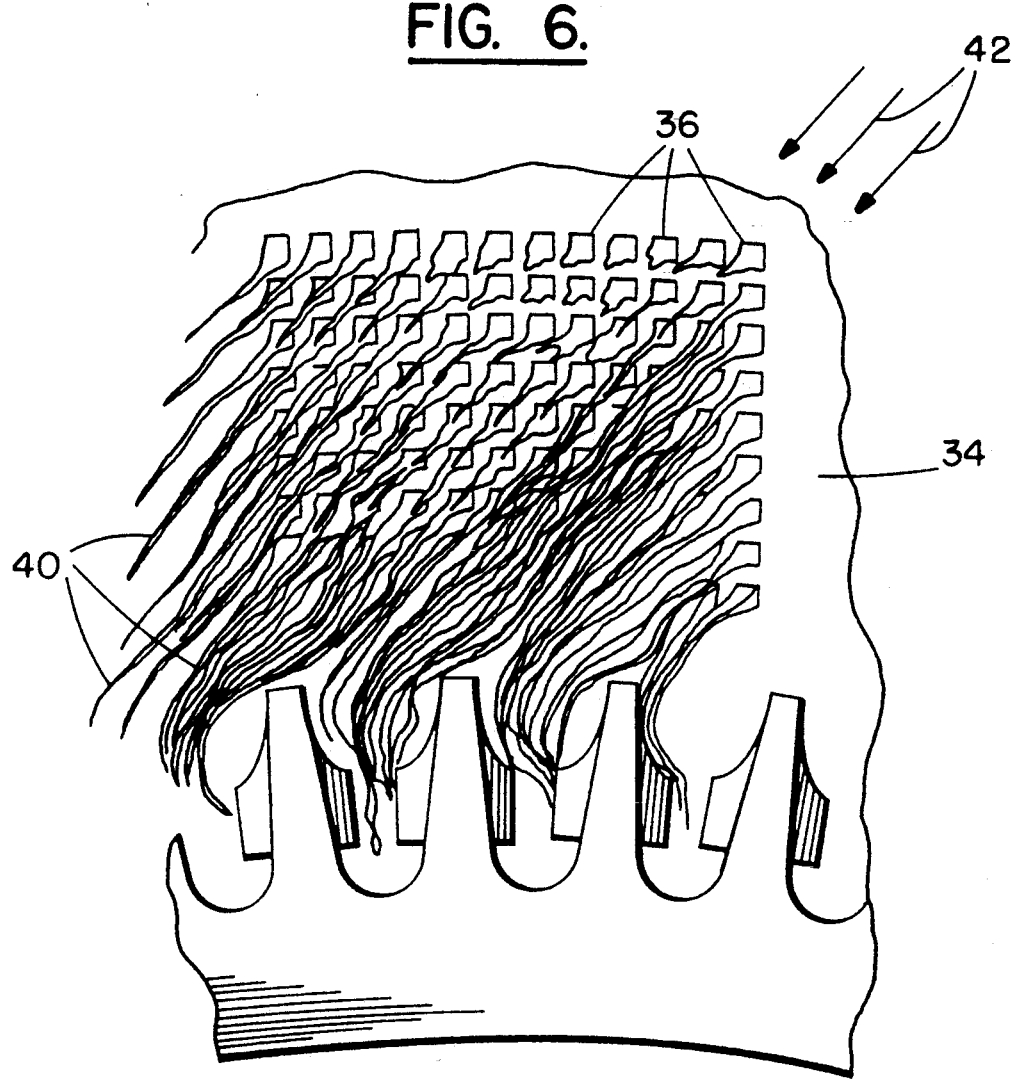

FLUID FLOW VISUALIZATION SYSTEM

BACKGROUND OF THE INVENTION

1. Field of the Invention

This invention relates to a method for the visualization of fluid flows over the surfaces of solid components at elevated temperatures. A smear caused by fluid flow across the surface of the substrate is indicative of the direction and/or speed of flow.

2. Description of the Prior Art

It is known to apply a coating, with non-geling characteristics, to a surface of a component which on the subsequent passage of a fluid flow thereover will move to produce a visible pattern of streaks in the coated surface. The pattern generated in the coating enables visualization of the fluid flow direction across the component surfaces.

According to the invention disclosed in U.S. Pat. No. 4,915,975 to Watson, for example, a method of fluid flow visualization comprises the steps of coating a component with a pigmented oil based paint of non-geling characteristics, applying dry dye particles which are soluble in the oil based paint to the surface of the coating and passing a fluid flow over the component, whereby the fluid flow causes the dye particles to translate across the coating dissolving to leave trails on the surface of the coating, which trails enable visualization of the passage of the fluid flow over the surface of the component. In that patent, the pigmented oil based paint preferably comprises a solid solution of a fluorescent pigment in a melamine formaldehyde sulphonamide resin suspended in a mineral oil. Also, the pigmented oil based paint preferably includes a wetting agent such as linoleic acid, and the dry dye particles applied to the coating of pigmented oil based paint are preferably of a contrasting phthalocyanine dye.

In U.S. Pat. No. 4,774,835 to Holmes et al., a liquid crystal coating has been formulated for use in aerodynamic or hydrodynamic testing, to change colors in response to differences in relative shear stress within the temperature environment of a test object. This liquid crystal coating is then applied to the surface of the test object, and the test object is subjected to a liquid or gas flow either in flight or in a wind or water tunnel. By recording and measuring the color changes produced within the boundary layer surrounding the surface of the test object, transition locations and modes are observed as well as such aerodynamic phenomena as shock locations and laminar separation bubbles.

U.S. Pat. No. 3,301,046 to Rubert et al. relates generally to a method of obtaining a permanent record of surface flow phenomena for future study and relates with particularity to a method of producing a mold of the surface flow pattern observed on a wind tunnel test model, when employing the oil-smear indicating technique, and displaying this mold in such manner as to permit photographic permanent recordation of the surface flow pattern obtained. According to that invention, a mixture of oil and lampblack is applied to selected areas of a specific wind tunnel test model. The test model is subjected to a specific wind tunnel test; and, after completion of the test, the wind tunnel is shut down, the model removed and a film of liquid room-temperature vulcanizable elastomeric material is applied over the entire model test surface area and permitted to cure. As the elastomeric material cures, it completely absorbs the oil smear on the test model and retains every minute detail of the surface flow pattern as indicated by these oil smears. After curing, the film of flexible elastomeric material is stripped from the test model to provide a pattern of the surface flow which may then be displayed for suitable photographing and permanent recordation thereof.

Another pertinent prior art reference is U.S. Pat. No. 3,415,122 to Yee which discloses a temperature indicator in the form of a ceramic film for sensing and recording temperatures in the range of 900° C.-1400° C. The film may be attached, for example, to the outer skin of a space vehicle. When recovered after re-entry of the space vehicle, the indicator is cleaned, polished, and photomicrographed, then compared with calibration photomicrographs to determine the maximum temperature to which the space vehicle was subjected.

SUMMARY OF THE INVENTION

It was in light of the foregoing that the present invention has been conceived and is now reduced to practice. The invention concerns the application of a layer of ceramic or glass particles to the surface of a substrate which is to be heated and subjected to gas flow across its surface. The glass or ceramic particles are sized and mixed with an organic binder which gives the applique a thin paint-like slurry consistency. This binder burns off but leaves essentially no residue after combustion and holds the glassy particles together so they adhere to the substrate at low temperature. The glass or ceramic particles in the coating are chosen to have a melting point below the operation temperature of the surface so that the applique will flow in the direction of gas movement. Additionally, the choice of melting point is made to give the coating a viscosity which permits enough "smearing" at the velocity and time of interest for visual inspection. Also, the glass or ceramic particles are chosen to have high adhesion to native metal oxides to insure that the coating does not fall off the surface before post test inspection described below is performed. Operationally, a part is coated with glass or ceramic particles suspended in the liquid organic carrier or binder. The carrier or binder hardens. Then the part is subjected to the running environment. When subsequently cooled, trails of the melted glass or ceramic particles become fixed on the substrate, allowing post test inspection. Such inspection after test provides a determination of flow direction and possibly relative magnitude of the flow.

Features and benefits of the invention include the simplicity of its preparation and application to the substrate, and its inertness to chemical interactions, including resistance to oils. Also, the invention has superior properties of adherence to its substrate, is less susceptible to erosion, and provides increased accuracy and resolution. Additionally, the fluid flow indicating appliques of the invention can be relatively easily tailored to have a thermal expansion similar to that of its underlying substrate.

A particularly desirable feature of the invention when the coatings are chosen to be adherent to the substrate resides in its ability to accommodate operation at lower temperatures than maximum, such as those encountered during start up or shut down or intermediate points desired. Such operation does not affect readings since particles do not flow at lower temperature and are adherent enough to withstand substantial aerodynamic "scrubbing". This makes the invention particularly useful to allow more data to be gathered per test, or where flow changes with temperature level.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 6 is a detail plan view depicting typical airflow across the surface on an engine component to which coatings have been applied according to the invention;

DETAILED DESCRIPTION OF THE PREFERRED EMBODIMENT

The thin film fluid flow visualization appliques of the invention are produced by mixing particles of ceramic or glass chosen to have the desired adhesion to the intended substrate generally in the size range of smaller than approximately 38 microns across for sharp transition temperature determination in a carrier material. The carrier material may be an organic binder which serves as a polymeric over coat. This binder may be, for example, a mixture composed of a water soluble cellulose acetate sold by Dow Chemical Corporation of Midland, Mich. under the trademark METHOCEL, a silanol monomer sold under the trademark VIE 4BP sold by Applied Concepts, Inc. of Miami, Fla., and distilled water. These three materials are preferably mixed in a ratio of 5 grams glass or ceramic particles to 14.5 milliliters of METHOCEL liquid and 0.5 milliliter of VIE 4BP monomer. The METHOCEL liquid is a mixture composed of approximately four grams of powder and 240 ml. distilled water. The mixture is shaken vigorously until a thin slurry consistency is obtained, after which final application is achieved, preferably by spraying, although the slurry mixture may also be brushed or otherwise applied onto the substrate on which it is to perform.

Different melting temperature appliques can be developed by changing the composition of the ceramic and/or glass particles within the thin coating. This may be achieved by the addition of refractory glass formers (SiO$_2$) to the ceramic/glass mixture before grinding and dispersion. Silica (SiO$_2$) has a very high melting point (approximately 3000° F.) and is an excellent glass network former. Therefore, by adding incremental amounts of silica to the mixture, the melting temperature of the fluid flow visualization appliques of the invention can be increased.

Figure 1:
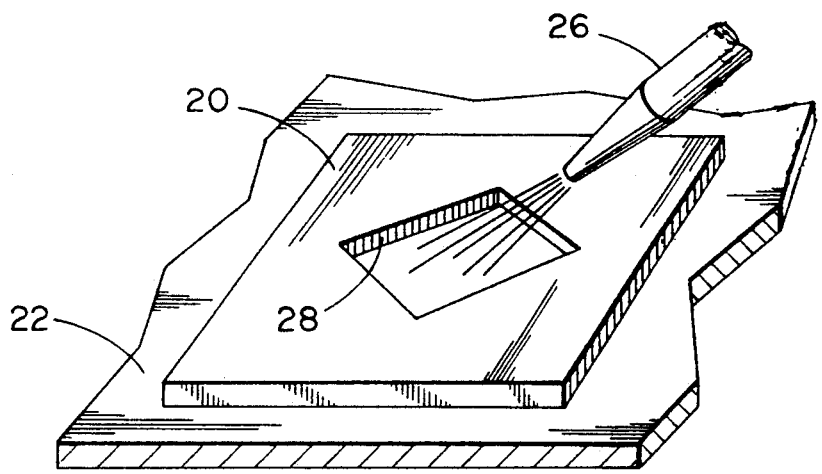
FIG. 1 is a detail perspective view illustrating one method of applying onto a substrate a thin film fluid flow visualization applique embodying the invention.

Turn now to the drawings and, initially, to FIG. 1. In this figure, a suitable mask 20 is diagrammatically illustrated overlying a metal substrate 22 on which a thin film fluid flow applique 24 (FIGS. 2 and 3) is to be applied. A slurry comprised of a mixture of ceramic and glass particles and its organic binder may be sprayed onto the substrate 22 by means of a nozzle 26 directed towards the substrate 22, specifically, within the confines of an opening 28 formed in the mask 20. The mixture continues to be applied to the substrate 22 until the entire opening 28 overlying the substrate 22 has been filled to a substantially uniform thickness. This uniform thickness is preferably in the range of approximately 150 to 300 microns.

While the shape of the opening 28 has been illustrated as a square or diamond, it will be understood that a wide variety of shapes including squares, circles, and polygons, regular or irregular, may be used to good effect. Also, the size of the opening 28 is not critical to the invention but may be of a wide range of sizes depending upon the particular application intended for the applique 24. In a typical application, which may be on the surface of a combustor curl for a gas turbine engine, a lateral dimension of the opening 28 and, therefore, of the resulting applique 24 may be in the range of approximately 0.125 inches to 0.250 inches although the former dimension is a preferred one to achieve optimum results.

In operation, as, for example, in the combustor curl of a gas turbine engine, airflow indicated by the arrows 30 (FIG. 2) is directed across the substrate 22 and over and around each applique 24. The polymer over coat comprising the organic carrier or binder in which the glass or ceramic particles are suspended is chemically stable up to approximately 1000° F. at which point it decomposes cleanly and forms gases with substantially no solid residue. The melting point of the ceramic or glass particles in the applique 24 is preselected to be in the range of between 100° F. and 200° F. less than the elevated operating temperature of the substrate. In the typical operation of a gas turbine engine, it would take several minutes to achieve the peak operating temperature.

According to one aspect of the invention, the viscosity of the applique 24 to the anticipated operational time and temperature of the substrate 22 is matched. A mathematical relationship which has been developed for this purpose is indicated as follows:

$$u_{req}(T_{req}) = (t_{req}/t_{orig})u(T_{orig})$$

where $u_{req}(T_{req})$ is the viscosity required at the required test temperature; $t_{req}$ is the required test time; $t_{orig}$ is the original (standard) test time, and $u(T_{orig})$ is the viscosity at the original test temperature. The values of viscosity at temperatures for various glass mixtures are determined empirically.

Figure 2:
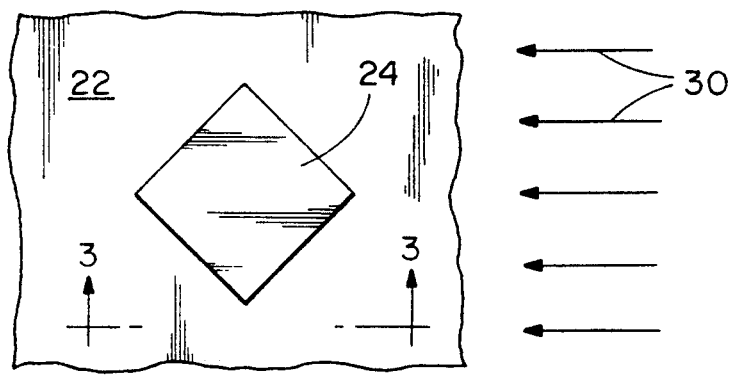
FIG. 2 is a detail top plan view of an applique of the invention mounted on a substrate and being subjected to a flow of high temperature gas across the surface of the substrate.
Figure 4:
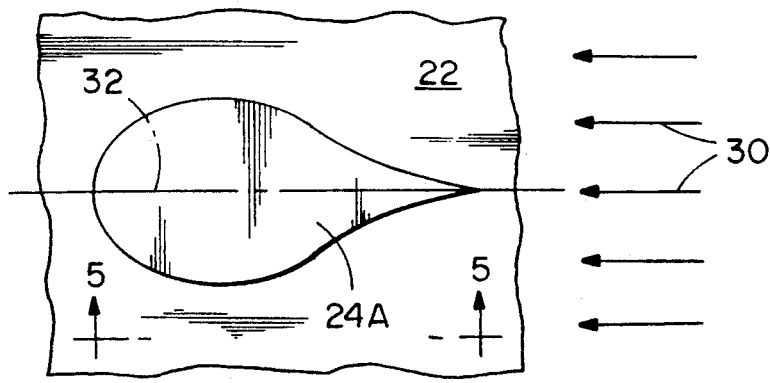
FIG. 4 is a detail top plan view of a smear resulting from the flow across the substrate of high temperature gas after an extended period of time.
Figure 3:
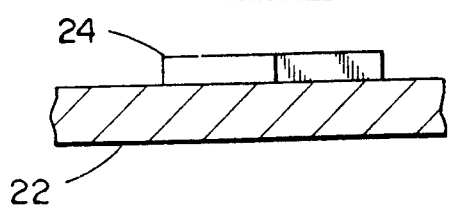
FIG. 3 is a detail cross sectional view taken generally along line 3—3 in FIG. 2.
Figure 5:
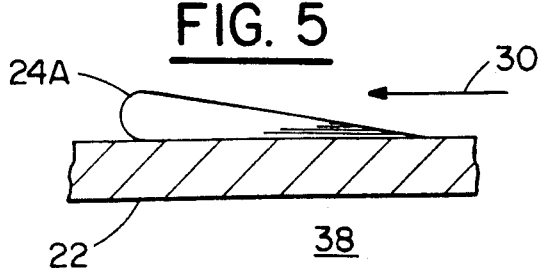
FIG. 5 is a cross section view taken generally along line 5—5 in FIG. 4.

With continued airflow across the substrate 22, the initial shape of the applique 24 as represented in FIGS. 2 and 3, becomes altered to a smear, or teardrop shape, 24A as depicted in FIGS. 4 and 5. The shape and length of the smear 24A as well as the alignment of a major resulting longitudinal axis 32 thereof are indicative of the temperature and direction of flow of the heated gas across the surface of the substrate 22. The longitudinal axis 32 will be generally aligned with the direction of flow of the heated gas and the length of the smear 24A along the axis 32 is indicative of the speed of the stream of heated gas flowing across the substrate 22. Upon the cessation of flow across the substrate and its return to room temperature, the smear 24A will harden into a permanent indicator preserving the effects of the gas flow across the substrate 22.

The following example typifies the use of the present invention:

EXAMPLE

A combustor curl 34 from a gas turbine engine is coated on its surface with a grid of ⅛"squares 36 of glass material chosen to have a melting point of approximately 1100° F. applied by airbrush to a thickness of 0.012". When the curl reaches its normal operating temperature of 1200° F. (previously measured) as a result of combustion in a region 38 opposite the surface on which the glass squares 36 are applied, the glass melts and smears, as at 40 in FIG. 6, in the direction of airflow 42 which tends to be a swirling flow oriented at about 40° to a radial direction. When the engine is later disassembled, the angle of these smears relative to a radial line is measured for use in heat transfer predictions. The length of the smears may be compared to give relative velocity magnitudes.

While preferred embodiments of the invention have been disclosed in detail, it should be understood by those skilled in the art that various other modifications may be made to the illustrated embodiment without departing from the scope of the invention as described in the specification and defined in the appended claims.

I claim:

1. A method of visualizing flow of a gas across the surface of a substrate heated to an elevated operating temperature in the range of approximately 1000° F. to approximately 3000° F. comprising the steps of:
    applying to the substrate a coating chosen to have high adhesion to the substrate and comprised of a mixture of material selected from the group consisting of metals and compounds of metals and ceramics, and of an organic binder, the coating having an initial size less than the area of the substrate and including a thickness generally in the range of 150 to 300 microns and an initial shape and a melting point;
    directing a stream of gas having a temperature in the range of approximately 1000° F. to approximately 3000° F. across the substrate;
    selecting the melting point of the material of the coating to be in the range of between 100° F. and 200° F. less than the elevated operating temperature of the substrate whereby, after a time interval, the coating is caused to melt and, under the influence of the stream of gas, migrates across the surface of the substrate to form a smear of elongated shape generally aligned with the direction of flow of the stream of gas and having an elongated size greater than the initial size generally in proportion to the speed of the stream of gas;
    terminating the flow of the gas across the surface of the substrate; and
    inspecting the smear on the surface of the substrate to thereby determine the direction and speed of the gas flow.

2. A method as set forth in claim 1 wherein the coating is of glass forming ceramic material composed substantially of $SiO_2$ with lesser amounts of glass forming metallic oxides.

3. A method as set forth in claim 1 wherein the step of applying the coating to the substrate is performed by brushing the coating onto the substrate.

4. A method as set forth in claim 1 wherein the step of applying the coating to the substrate is performed by spraying the coating onto the substrate.

5. A method as set forth in claim 1 wherein the substrate is metal.

6. A method as set forth in claim 1 wherein the organic binder is a mixture composed of a water soluble cellulose acetate, a silanol monomer, and distilled water.

7. A method as set forth in claim 6 wherein the mixture of the coating is in a ratio of approximately 5 grams glass or ceramic particles to 14.5 milliliters of cellulose acetate and 0.5 milliliter of silanol monomer, the cellulose acetate solution comprised of approximately 4 grams cellulose acetate powder dissolved in approximately 240 ml. of distilled water.

8. A method of visualizing flow of a gas across the surface of a substrate heated to an elevated operating temperature in the range of approximately 1000° F. to approximately 3000° F. comprising the steps of:
    applying to the substrate a coating chosen to have high adhesion to the substrate and comprised of a mixture of material selected from the group consisting of metals and compounds of metals and ceramics, and of an organic binder, the coating having an initial size less than the area of the substrate and including a thickness generally in the range of 150 and 300 microns and an initial shape and a melting point;
    selecting the melting point of the material of the coating to be in the range of between 100° F. and 200° F. less than the elevated operating temperature of the substrate whereby, when a stream of gas having a temperature in the range of approximately 1000° F. to approximately 3000° F. is directed across the substrate, after a time interval, the coating is caused to melt and, under the influence of the stream of gas, migrates across the surface of the substrate to form a smear of elongated shape generally aligned with the direction of flow of the stream of gas and having an elongated size greater than the initial size generally in proportion to the speed of the stream of gas; and
    inspecting the smear on the surface of the substrate when the flow of the gas across the surface of the substrate ceases to thereby determine the direction and speed of the gas flow.

* * * * *